United States Patent
Garg et al.

(10) Patent No.: US 11,169,898 B2
(45) Date of Patent: Nov. 9, 2021

(54) SYSTEM AND METHOD FOR DATABASE REPLICATION BENCHMARK TESTING USING A PIPELINE-BASED MICROSERVICES MODEL

(71) Applicant: Oracle International Corporation, Redwood Shores, CA (US)

(72) Inventors: Anuj Garg, Bengalauru (IN); Anup Mishra, Bangalore (IN); Deekshit Mantampady, Bangalore (IN); Rashmi Badan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 351 days.

(21) Appl. No.: 15/935,702

(22) Filed: Mar. 26, 2018

(65) Prior Publication Data
US 2019/0294519 A1    Sep. 26, 2019

(51) Int. Cl.
*G06F 11/34* (2006.01)
*G06F 11/30* (2006.01)
*G06F 16/27* (2019.01)

(52) U.S. Cl.
CPC ...... *G06F 11/3428* (2013.01); *G06F 11/3034* (2013.01); *G06F 16/27* (2019.01)

(58) Field of Classification Search
None
See application file for complete search history.

(56) References Cited

U.S. PATENT DOCUMENTS 10,466,978 B1 * 11/2019 Vidan ............... G06N 20/00
2015/0019195 A1 * 1/2015 Davis ............. G06F 11/3447
703/17

(Continued)

OTHER PUBLICATIONS

Oracle, "Oracle GoldenGate Performance Best Practices", Oracle Maximum Availability Architecture, Oracle White Paper, May 2017, 41 pages.

(Continued)

*Primary Examiner* — Tony Mahmoudi
*Assistant Examiner* — Umar Mian
(74) *Attorney, Agent, or Firm* — Tucker Ellis LLP

(57) ABSTRACT

In accordance with an embodiment, described herein is a system and method for database replication benchmark testing. The system can include one or more microservices configured to collect performance metrics from a testing environment, and a plurality of workload configurations that define different types of pipelines. Each pipeline can be used to execute a workload, and use different techniques to handle errors during the execution of the pipeline. A pipeline control manager can receive a workload configuration, and identify a pipeline defined therein. The pipeline control manager can invoke the one or more microservices to collect performance metrics from the testing environment, and use the collected performance metrics to validate the testing environment before starting the workload. Performance metrics from each pipeline stage can be consolidated and displayed at a user interface. The system can automatically select a workload configuration based on a replication feature to be tested.

18 Claims, 15 Drawing Sheets

(56) References Cited

U.S. PATENT DOCUMENTS

| | | | |
|---|---|---|---|
| 2015/0019707 A1* | 1/2015 | Raghunathan | G06F 11/3428 |
| | | | 709/224 |
| 2017/0093755 A1* | 3/2017 | Pol | G06F 16/137 |
| 2017/0270245 A1* | 9/2017 | van Rooyen | G16B 30/00 |
| 2018/0025289 A1* | 1/2018 | Doshi | G06F 9/50 |
| | | | 706/12 |
| 2018/0150297 A1* | 5/2018 | Batley | G06F 9/3836 |
| 2019/0042286 A1* | 2/2019 | Bailey | G06F 9/45504 |
| 2019/0138288 A1* | 5/2019 | Brealey | G06F 8/77 |

OTHER PUBLICATIONS

Attunity, "Attunity Replicate: Universal Data Replication and Data Ingestion", retrieved May 4, 2021 from https://web.archive.org/web/20180306215051/https://www attunity.com/products/replicate/, 10 pages.

"HammerDB", https://www.hammerdb.com/about.html, Apr. 2021, 5 pages.

Oracle, "Oracle GoldenGate: Replication and Transform Data", retrieved May 4, 2021 from https://www.oracle.com/integration/goldengate/, 17 pages.

Paul, Subharthi, "Database Systems Performance Evaluation Techniques", Nov. 24, 2008, 12 pages.

Qlik, "Qlik Data Integration Platform", retrieved on May 4, 2021 from https://www.qlik.com/US/products/data-integration-products, 6 pages.

"TPC-C Benchmark", retrieved on May 4, 2021 from http://www.tpc.org/tpcc/, 13 pages.

Wikipedia, "Microservices'", retrieved on May 4, 2021 from https://en.wikipedia.org/wiki/Microservices, 6 pages.

* cited by examiner

FIGURE 9

SYSTEM AND METHOD FOR DATABASE REPLICATION BENCHMARK TESTING USING A PIPELINE-BASED MICROSERVICES MODEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software applications and database systems, and are particularly related to a system and method for benchmark testing database replication applications using a pipeline-based microservices model.

BACKGROUND

Benchmark testing is the process of load testing an application or a particular feature of an application end-to-end, to determine the performance characteristics of the application. A database replication benchmark application (benchmark application) can be used to benchmark test database replication applications/tools, e.g., Oracle™ GoldenGate.

In benchmark testing, resource utilization in a testing environment can impact the testing result of a benchmark application. For example, when system resources, for example, CPU, memory, or I/O resources, are heavily utilized, the testing result of the benchmark application may not be accurate.

However, benchmark applications typically do not validate testing environments before starting workloads for benchmark testing. They may also lack certain features that organizations need, for example, support for representational state transfer (RESTful) APIs and function for comparing testing results of different versions or replication features of a database replication application.

SUMMARY

In accordance with an embodiment, described herein is a system and method for database replication benchmark testing. The system can include one or more microservices configured to collect performance metric from a testing environment, and a plurality of workload configurations that define different types of pipelines. Each pipeline can be used to execute a workload, and use different techniques to handle errors during the execution of the pipeline. A pipeline control manager can receive a workload configuration, and identify a pipeline defined therein. The pipeline control manager can invoke the one or more microservices to collect performance metrics from the testing environment, and use the collected performance metrics to validate the testing environment before starting the workload. Performance metrics from each pipeline stage can be consolidated and displayed at a user interface. The system can automatically select a workload configuration based on a replication feature to be tested.

BRIEF DESCRIPTION OF THE FIGURES

FIG. 9 illustrates an example user interface in accordance with an embodiment.

DETAILED DESCRIPTION

Figure 1:
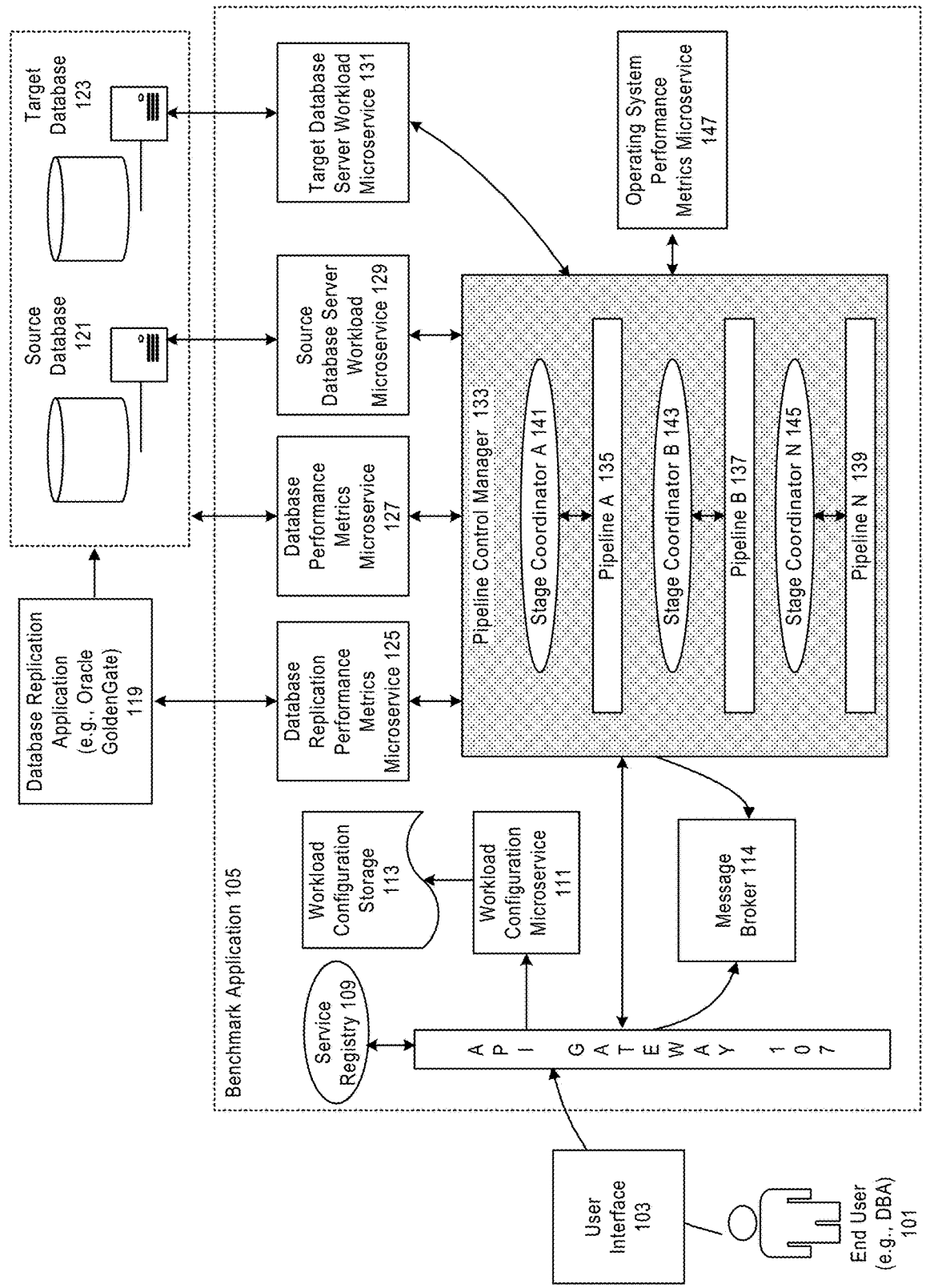
FIG. 1 illustrates a system for benchmark testing database replication applications using a pipeline-based microservices model, in accordance with an embodiment.

A database replication application, e.g., Oracle GoldenGate, can capture and replicate data changes from a source database to a target database in a database replication environment, which can include one or more computers with operating systems and various database applications executing thereon. Example database applications can include database servers, databases, database services, and third-party tools (e.g., a data modeling tool and a backup compression tool).

As described above, database replication benchmark applications (benchmark applications) can be inadequate in that they do not have some of the features that organizations need.

To address the inadequacies, described herein is a system and method for benchmark testing database replication applications using a pipeline-based microservices model.

In accordance with an embodiment, the system can include one or more microservices configured to collect performance metrics from a testing environment, and a plurality of workload configurations that define different types of pipelines. Each pipeline can be used to execute a workload, and can use different techniques to handle errors during the execution of the pipeline. A pipeline control manager can receive a workload configuration, and identify a pipeline defined therein. The pipeline control manager can invoke the one or more microservices to collect performance metrics from the testing environment, and use the collected performance metrics to validate the testing environment before starting the workload. Performance metrics from each pipeline stage can be consolidated and display at a user interface. The system can automatically select a workload configuration based on a replication feature to be tested.

In accordance with an embodiment, as used herein, the testing environment can include the database replication environment and one or more computing environments that hosts the pipeline control manager and the plurality of microservices. The pipeline control manager and the plurality of microservices can be provided in the database replication environment.

In accordance with an embodiment, the workload configuration received at the pipeline control manager can be a default workload configuration, or a workload configuration selected at a user interface from a plurality of workload configurations stored in a workload configuration store. The default workload configuration or the selected workload configuration can be modified by an end user.

In accordance with an embodiment, each of the plurality of workload configurations can be an Extensible Markup Language (XML) file or a JavaScript Object Notation (JSON) file that defines a source database, a target database, a pipeline type, a number of users, a number of tables to be created, and an execution plan.

Using the plurality of workload configurations, the system can benchmark test an entire database replication application or one or more of its individual features, and can run multiple pipelines to execute the same workload or different workloads on multiple databases concurrently. A plurality of tasks within each stage of a pipeline can also execute in parallel.

In accordance with an embodiment, each pipeline can include a plurality of common tasks, for example, establishing connectivity, creating database/tables, creating test users, executing data manipulation language (DML) operations, and consolidating output (e.g., performance metrics). However, each pipeline can be configured to process a different type of workload, and to use a different approach to handle errors encountered during the execution of the pipeline.

In accordance with an embodiment, the plurality of microservices can be distributed across a network and can be invoked from the pipeline control manager. Each of the plurality of microservices can be a web service or another type of service that runs in its own process and communicating with another of the plurality of microservices using lightweight mechanisms, e.g., an HTTP resource API. The microservices can include one or more microservices configured to collect performance metrics from the testing environment, and store the performance metrics in one or more data stores; one or more microservices configured to execute tasks against the database replication environment; and one or more microservices configured to retrieve the performance metrics from the one or more data stores, and analyze and categorize the performance metrics data to map each replication feature to a workload configuration. The mapping information enables the system to automatically select a workload configuration for use in response to an end user selecting a replication feature to test.

In accordance with an embodiment, each of the plurality of microservices can provide a REST API. The REST APIs of one or more microservices can be invoked by the pipeline control manager at a configurable fixed interval to collect performance metrics from the testing environment. Alternatively, for a database replication application that supports REST APIs, the REST APIs of the one or more microservices can be called by the database replication application when performance metrics are available.

In accordance with an embodiment, the above-described features enable organizations to stage their data and use different workload configurations to benchmark test a database replication application, to determine the impacts of different workloads on a testing environment. Based on the impacts, the organizations can adjust hardware and/or software resources needed for the testing environment.

System Architecture

FIG. 1 illustrates a system for benchmark testing database replication applications using a pipeline-based microservices model, in accordance with an embodiment.

As shown in FIG. 1, a benchmark application 105 can include a plurality of microservices 111, 125, 127, 129, 131 and 147 that are configured to interact with a database replication environment, which can include a source database 121, a target database 123, and a database replication application 119. The database replication application can perform bi-directional log-based data change capture, distribution, transformation, and delivery between the source database and the target database.

In accordance with an embodiment, an API gateway 107 can receive a request for authentication from a user 101 through a user interface 103 of a client application, and send the authentication request to an authorization service. Upon the request being authenticated, the API gateway can discover the plurality of microservices and find the location (e.g., HTTP URL and respective port) of each microservice using a service registry 109.

As further described in FIG. 1, the API gateway can establish a connection with a workload configuration microservice 111 to retrieve a default workload configuration from workload configuration storage 113. The default workload configuration can be modified at the user interface, and sent to the API gateway, which can send the default or modified workload configuration to a pipeline control manager 133, and instantiate a message broker queue 114. The pipeline control manager can create a pipeline based on the workload configuration.

In accordance with an embodiment, the system can be pre-configured with a plurality of workload configurations, and each workload configuration can specify a pipeline and related information, for use by the pipeline to execute a workload configured for the pipeline.

In accordance with an embodiment, the system can include one or more smart pipelines (SPL), one or more ingenious pipeline (IPL), and one or more lazy pipelines (LPL). Each type of pipeline can have a set of pre-defined tasks that are automatically created when a pipeline of that type is created by the pipeline control manager.

In accordance with an embodiment, a smart pipeline can execute a heavy workload that takes time to complete. If an error occurs during the execution of the pipeline, the pipeline control manager can invoke one or more microservices to perform one or more pre-configured tasks to address the error. The pre-configured tasks can be subject to confirmation of an end user before they can be executed.

For example, when a replication-related error occurs due to heavy resource utilization, the pipeline control manager can clean disk temporary files to reclaim space, restart database services, and/or restart the database replication application.

In accordance with an embodiment, an ingenious pipeline can execute a moderate workload. If an error occurs during the execution of the pipeline, the pipeline control manager does not take actions to rectify the error, and instead can return the error with appropriate details to the user interface.

In accordance with an embodiment, a lazy pipeline can execute a small workload. If an error occurs during the execution of the pipeline, the pipeline control manager can pause the pipeline execution for a pre-configured period of time, to alert the end user that an error has occurred, so that the end user can address the error.

In accordance with an embodiment, whether a workload is heavy, moderate or small can be determined based the capacity of the testing environment.

For example, for a particular testing environment, the end user can determine that a workload that takes 2 hours or more to complete as heavy, a workload that takes from 1 to 2 hours as moderate, and a workload that takes 1 hour or less as small. The times used for categorizing workloads can be adjusted depending testing environments, or requirements of an end user.

In accordance with an embodiment, the workload classification information can be stored in a data store for use to create workload configurations.

In accordance with an embodiment, the benchmark application can support parallel execution of multiple pipelines 135, 137, and 139. Each pipeline can be created by the pipeline manager based on a workload configuration, and can be used to execute a plurality of pre-configured tasks. Further, each pipeline can be associated with a stage coordinator 141, 143, and 145, and can communicate with the pipeline control manager to invoke one or more microservices to execute one or more pre-configured tasks in each pipeline stage.

In accordance with an embodiment, while executing the workload, the pipeline control manager can continue to collect performance metrics from the testing environment, and post the performance metrics in the message broker queue. The performance metrics can be retrieved from the message broker queue, and displayed at the user interface.

In accordance with an embodiment, the performance metrics from the testing environment can be used to generate a graphical report along with replicated database objects and total counts of the replicated objects. The graphical report can be dynamically updated as performance metrics from each pipeline stage is being provided to the user interface.

Figure 2:
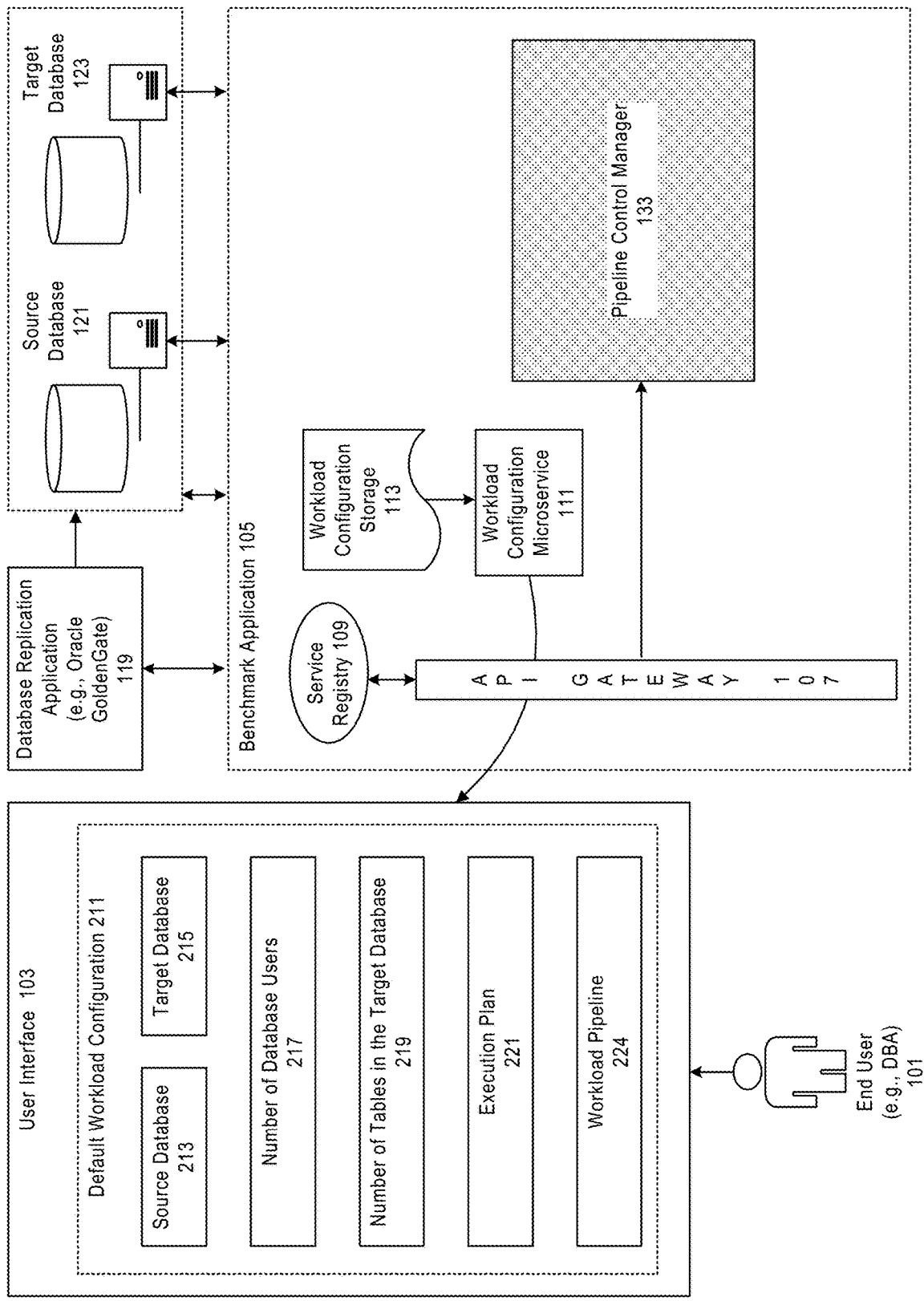
FIG. 2 further illustrates a system for benchmark testing database replication applications using a pipeline-based microservices model, in accordance with an embodiment.

FIG. 2 further illustrates a system for benchmark testing database replication applications using a pipeline-based microservices model, in accordance with an embodiment.

As shown by FIG. 2, the end user can view and modify a default workload configuration 211 at the user interface.

In accordance with an embodiment, the default workload configuration can include a source database 213, a target database 215, a number of database users 217, and a number of tables to be created in the target database 219, an execution plan 221, and a workload pipeline 224.

In accordance with an embodiment, the number of database users can be the number of simulated database users for the testing environment. The simulated users can be created during the execution of the pipeline.

In accordance with an embodiment, the execution plan can define frequency of commit, task concurrency, and whether a single database user or multiple database users are to be used for executing a workload.

Listing 1 illustrates some example execution plans in accordance with an embodiment:

Listing 1

INSERT [1M] ; 5 Users; Commit every INSERT; Parallel = Yes;
INSERT [1M]; 5 Users; Commit 10 INSERT; Parallel = no;

-continued

Listing 1

INSERT [10TH]+ UPDATE[10TH]+ DELETE[10TH]; 10 Users;
Commit 100 INSERT , 50 UPDATE, 10 DELETE; Parallel = Yes Testing Environment Validation FIG. 3 further illustrates a system for benchmark testing database replication applications using a pipeline-based microservices model, in accordance with an embodiment.

Figure 3:
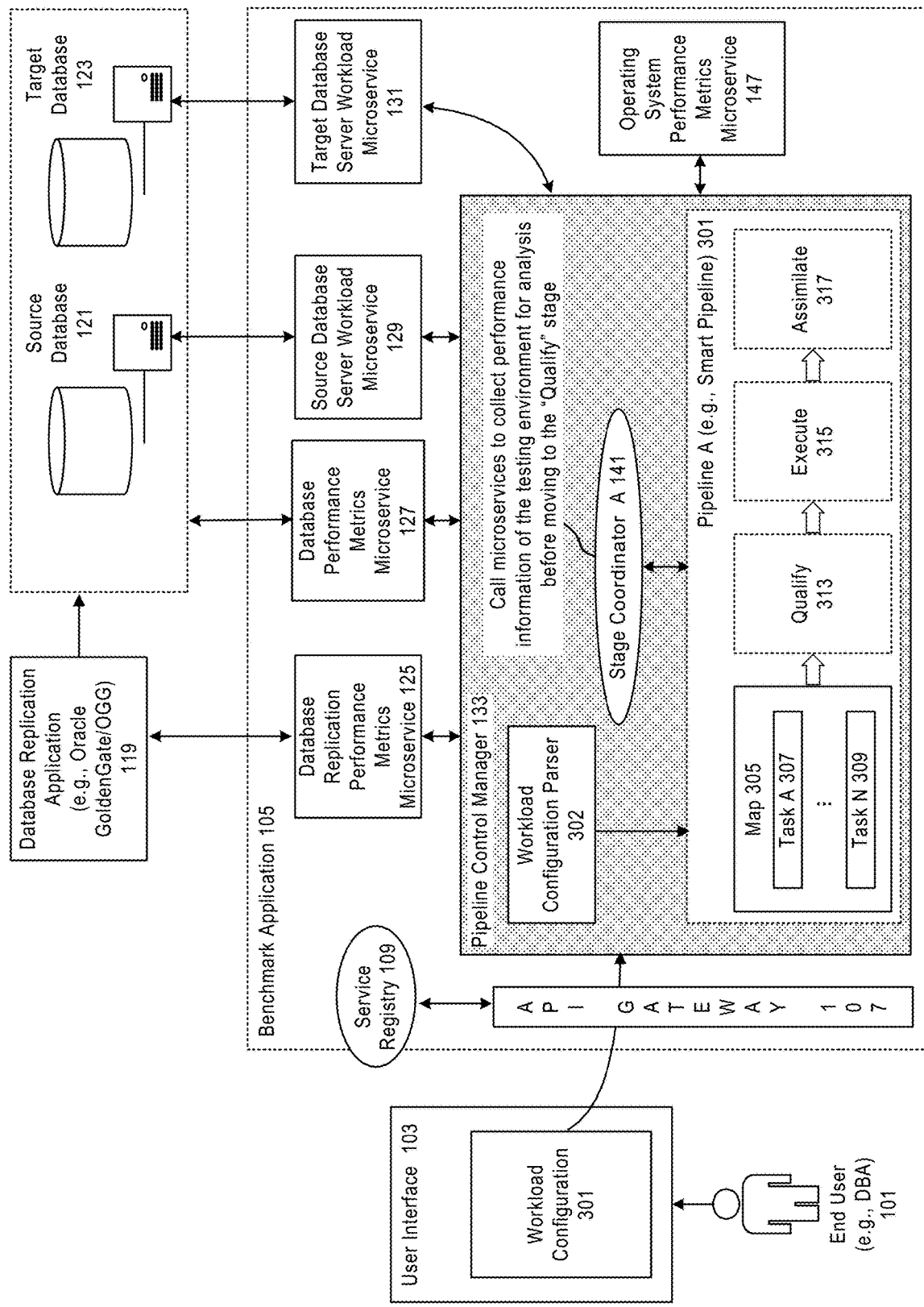
FIG. 3 further illustrates a system for benchmark testing database replication applications using a pipeline-based microservices model, in accordance with an embodiment.

As shown in FIG. 3, a workload configuration 301 can be received by the pipeline control manager. The workload configuration can be a default workload configuration originally configured for the system, or a modified workload configuration.

A workload configuration parser 302 can parse the workload configuration, identify the pipeline type defined by the workload configuration, and create a pipeline.

In accordance with an embodiment, the pipeline can include a map stage 305, a qualify stage 313, an execute stage 315, and an assimilate stage 317.

In accordance with an embodiment, the map stage can apply a task decomposition technique to identify tasks 307, 309 that can execute concurrently.

For example, using a recursive decomposition technique, the map stage can determine whether a particular task can be divided into a set of independent subtasks, and then determine whether each one of the subtasks can be further divided into smaller subtasks by recursively applying a similar division. The results of all the divisions can be combined into a list of tasks for concurrent execution.

In accordance with an embodiment, before starting to execute the remaining stages, the stage coordinator can invoke one or more microservices to collect performance metrics from the testing environment.

As shown in FIG. 3, the microservices used to collect performance metrics from a testing environment can include the database replication performance metrics microservice 125, the database performance metrics microservice 127, and the operating system performance metrics microservice 147.

In accordance with an embodiment, the performance metrics of the testing environment can include counter values on CPUs, disk I/O, network, and memory of various machines in the testing environment; and a capture rate of the database replication application.

In accordance with an embodiment, the counter values can indicate how well an operating system or an application, service, or driver is performing, which can be used to determine system bottlenecks and fine-tune system and application performance.

In accordance with an embodiment, the capture rate can be calculated from lag information from the database replication application. When the database replication application captures records from the source database and writes them into an intermediate format either on disk or in memory, a heartbeat function can be used to read lag information from tables at runtime. Lag can be the difference in seconds between the time the last record is processed based on the system dock and the timestamp of the record in an intermediate format.

Figure 4:
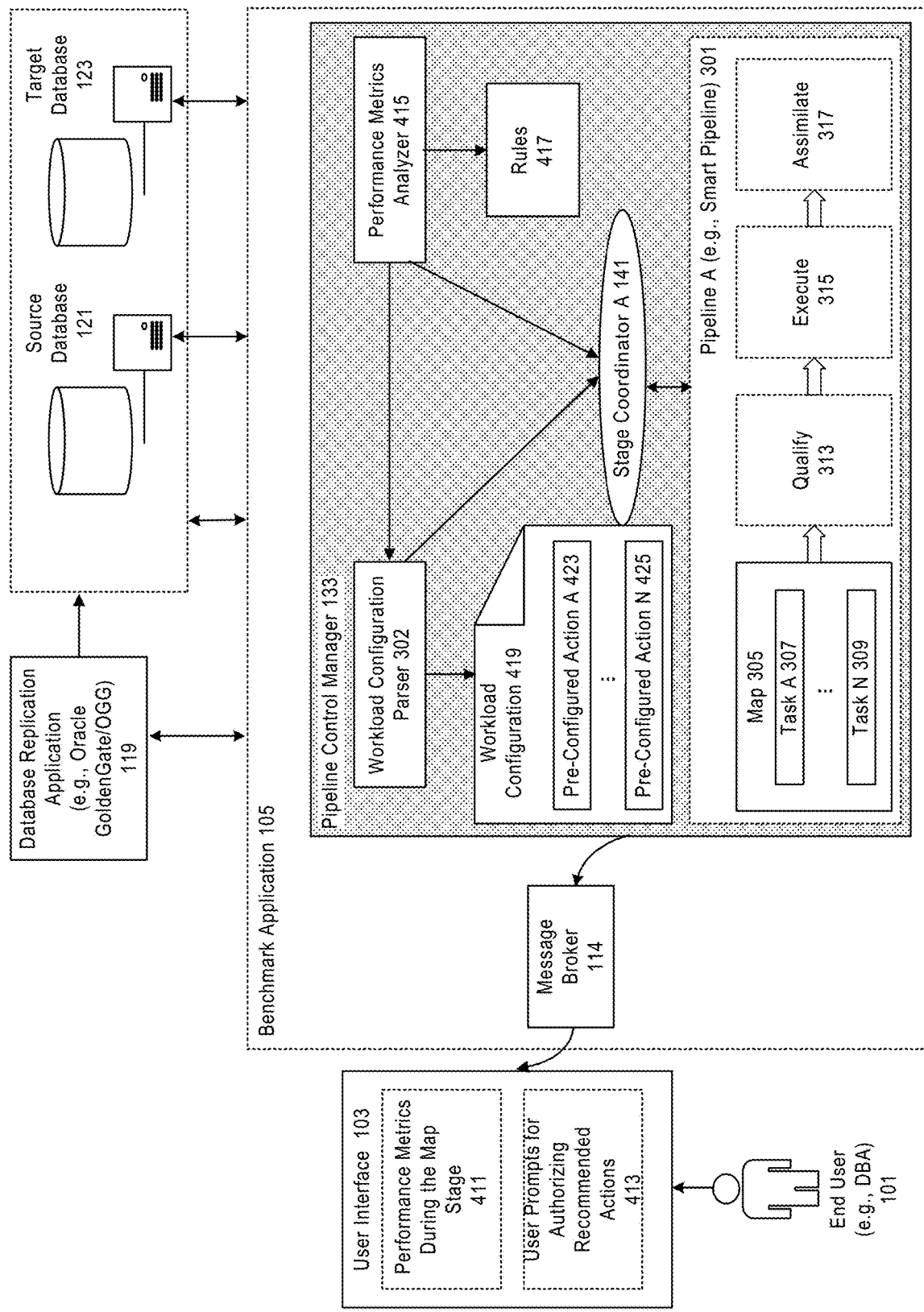
FIG. 4 further illustrates a system for benchmark testing database replication applications using a pipeline-based microservices model, in accordance with an embodiment.

FIG. 4 further illustrates a system for benchmark testing database replication applications using a pipeline-based microservices model, in accordance with an embodiment.

In accordance with an embodiment, a performance metrics analyzer 415 can receive the performance metrics from the testing environment, and analyze them against a set of pre-configured rules 417.

For example, the set of rules can define a threshold for each resource (e.g., RAM or CPU) on a particular machine in the testing environment. If usage for a particular resource exceeds the threshold value defined for the resource, the performance metrics analyzer can generate an error/warning. Similarly, the performance metrics analyzer can generate an error/warning if usage for the combined resources on all the machines in the testing environment exceeds a threshold value defined for the combined resources.

In accordance with an embodiment, in FIG. 4 which illustrates a smart pipeline, when an error or warning is generated, the pipeline control manager can pause the execution of the pipeline, and provide one or more recommended actions (e.g., terminating one or more applications unrelated to benchmark testing) to the end user through the user interface.

In accordance with an embodiment, the pipeline control manager can generate user prompts for the recommended actions 413, for the end user to accept or reject the recommendation. The system can also display performance metrics during the map stage 411 at the user interface.

In accordance with an embodiment, the end user can configure how an error or warning should be addressed in the workload configuration associated with the pipeline.

For example, if the pipeline control manager determines that the system is slow, the pipeline control manager can terminate one or more I/O intensive third-party applications as configured in the workload configuration.

In accordance with an embodiment, the workload configuration can include a SMART-SUSPEND tag used to specify one or more third-party applications.

As shown by FIG. 4, a workload configuration 419 includes a plurality of pre-configured actions 423, 425. The performance metrics analyzer can provide the recommended actions based on the pre-configured actions.

Figure 5:
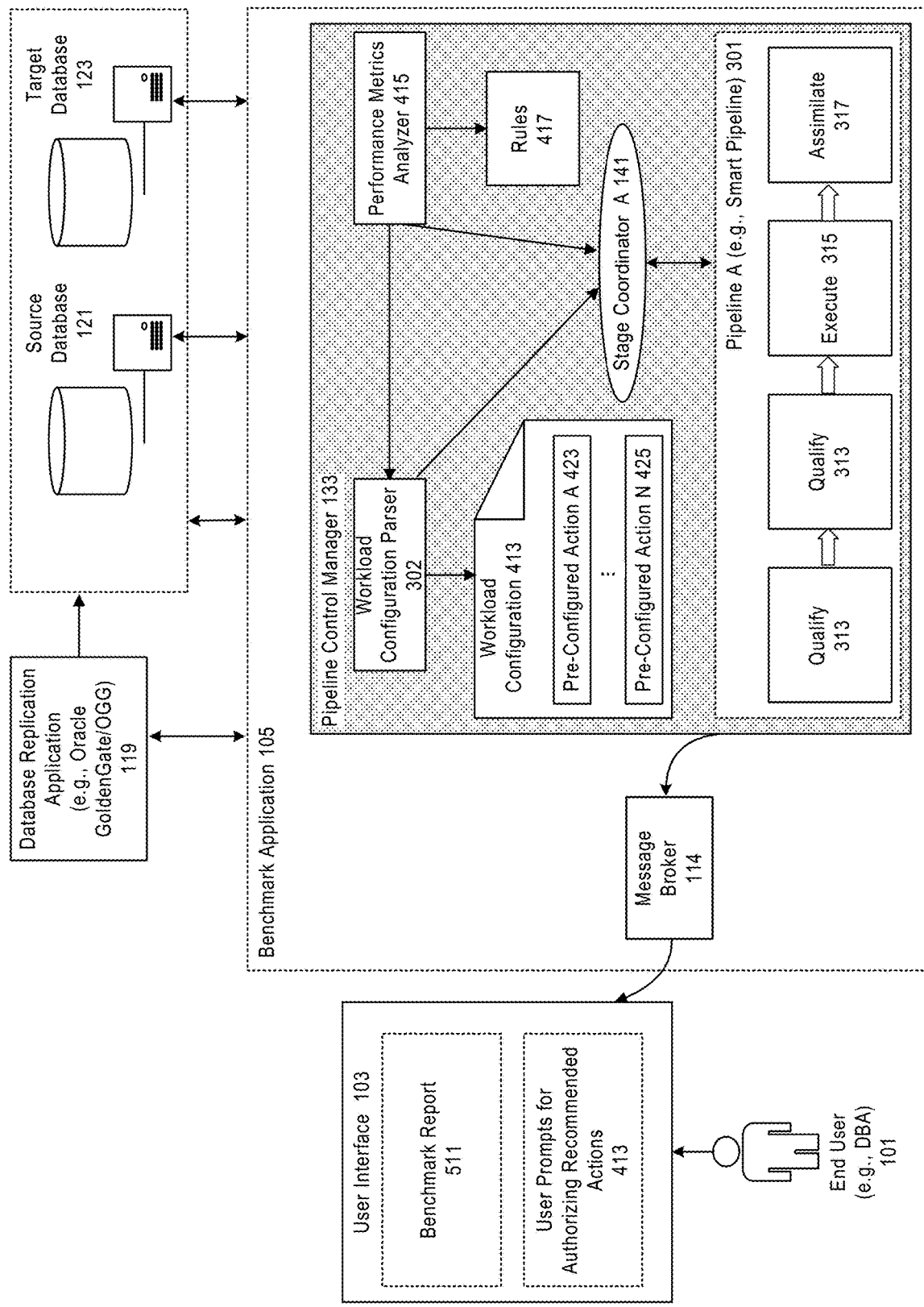
FIG. 5 further illustrates a system for benchmark testing database replication applications using a pipeline-based microservices model, in accordance with an embodiment.

FIG. 5 further illustrates a system for benchmark testing database replication applications using a pipeline-based microservices model, in accordance with an embodiment.

In accordance with an embodiment, if the end user accepts the recommended actions, the pipeline manager can start the workload, for example, by executing data definition language (DDL) operations and data manipulation language (DML) operations on the source database and the target database.

As shown by FIG. 5, the stage coordinator can continue to execute each of the remaining pipeline stages after the end user accepts the recommended actions In accordance with an embodiment, during the execution of each remaining stage, the pipeline control manager can continue to collect performance metrics from the testing environment, determine whether an error/warning has occurred based on the set of rules, and prompt the end user for accepting or rejecting one or more recommended actions if an error/warning has occurred.

Further, at the end of the pipeline execution, a benchmark report 511 can be generated from the performance metrics collected from each stage of the pipeline execution, and displayed graphically to the end user at the user interface.

Automatic Replication Feature Selection

In accordance with an embodiment, the benchmark application can be used to benchmark test an entire database replication application or its individual replication features. The performance metrics for the replication features can then be compared to enable end users to determine which particular feature to use for better performance.

For example, Oracle GoldenGate can be configured in different modes (e.g., COORDINATED APPLY, BATCHSQL, and PARALLEL APPLY). Each mode can represent a different replication feature, and can generate different performance metrics.

In accordance with an embodiment, performance metrics collected over time in benchmark testing for each replication feature can be analyzed to map each replication feature to a workload configuration, so that when the replication feature is selected for testing, the corresponding workload configuration can be automatically selected.

Figure 6:
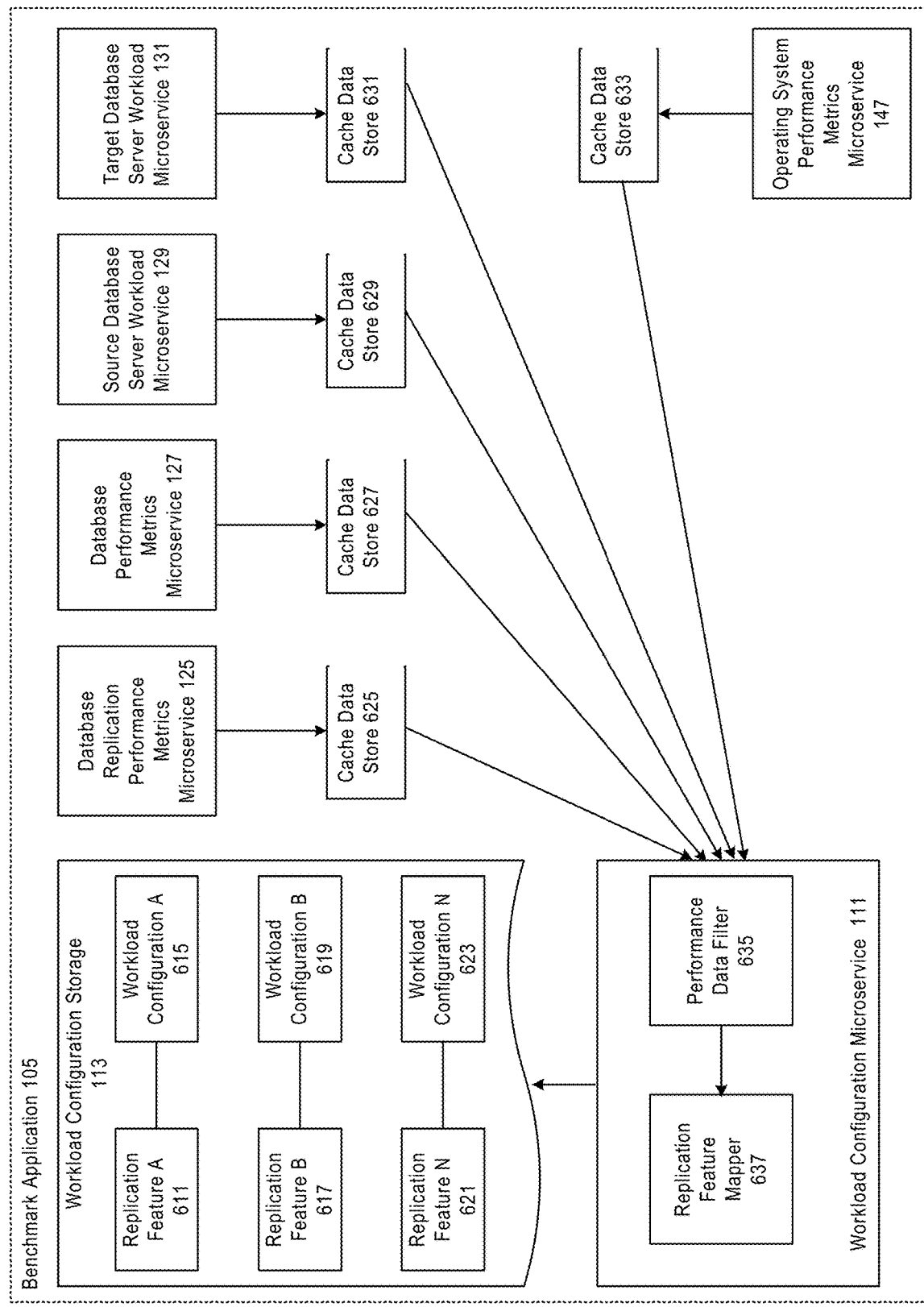
FIG. 6 illustrates a system for generating workload configurations to enable automatic selection of a workload configuration, in accordance with an embodiment.

FIG. 6 illustrates a system for generating workload configurations to enable automatic selection of a workload configuration, in accordance with an embodiment.

As shown in FIG. 6, the workload configuration microservice 111 can retrieve performance metrics from a plurality of cache data stores 625, 627, 629, 631, and 633 used to store performance metrics collected overtime from the testing environment.

In accordance with an embodiment, the workload configuration microservice can collect performance metrics from each cache data store at a configurable fixed interval. Alternatively, each cache data store can push performance metrics from that store to the workload configuration microservice whenever performance metrics are available in that store.

As shown in FIG. 6, the collected performance metrics can be categorized by a performance metrics filter 635, and then provided to a replication feature mapper 637, which can map each replication feature to a workload configuration.

In accordance with an embodiment, the pipeline control manager can maintain information for each pipeline created by the pipeline control manager, for example, a creation time, a completion time, and a unique identifier (UID) for the pipeline. The workload configuration microservice can use the pipeline information to filter out performance metrics entries that are unrelated to individual replication feature testing, and identify those performance metrics entries that are related to individual feature testing.

For example, the workload configuration microservice can determine whether a performance metric entry is generated by a particular pipeline by comparing the pipeline information and the timestamp for the performance metric entry, thereby determining whether the performance metric entry is associated with a workload configuration based on the one-to-one relationship between the pipeline and the workload configuration.

The workload configuration microservice can subsequently determine whether the workload configuration is configured for testing an entire database replication application or an individual feature based on one or more tags in the workload configuration.

In accordance with an embodiment, once all entries for a performance metric are identified for a workload configuration used for benchmark testing a particular replication feature, an average value (e.g., an average capture rate) of the entries can be calculated.

In accordance with an embodiment, the replication feature mapper can map the replication feature to a workload configuration with the best average value, for example, the best average capture rate. If the benchmark application generates the same average value for the performance metric for different workload configurations, the workload configuration with the smallest workload can be mapped to the replication feature.

As shown by FIG. 6, the workload configuration storage can include the mapping information between workload configurations 615, 619, and 623 and replication features 611, 617, and 621.

In accordance with an embodiment, the mapping information can be used by the benchmark application to automatically select a workload configuration, in response to the end user selecting a replication feature to test.

Pipelines

Figure 7:
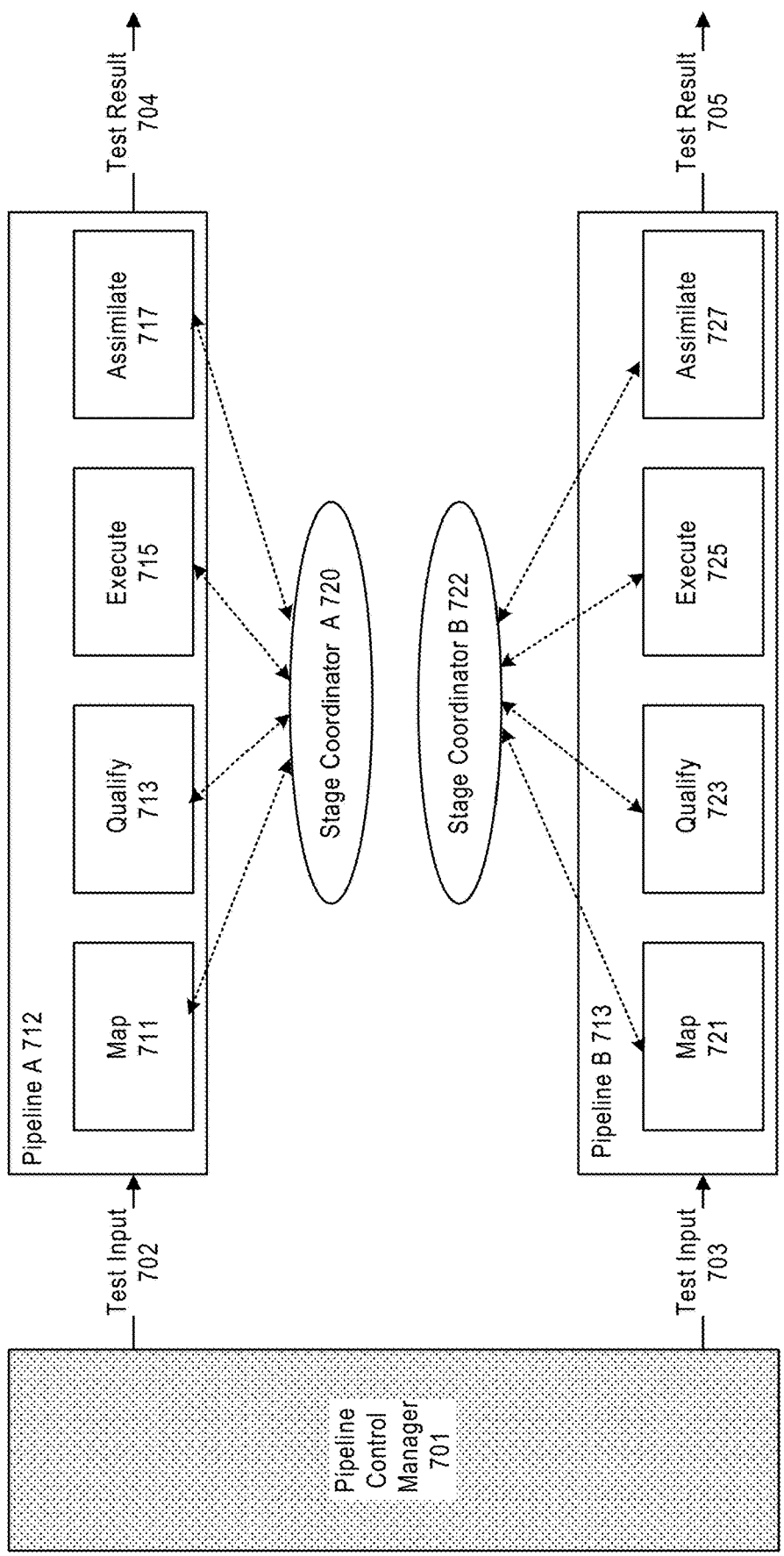
FIG. 7 illustrates pipeline concurrency in accordance with an embodiment.

FIG. 7 illustrates pipeline concurrency in accordance with an embodiment.

In accordance with an embodiment, a plurality of types of pipelines can be configured for a benchmark application. Each type of pipeline can include a plurality of common tasks, and can be configured to execute a different type of workload and use different error-handling techniques.

In accordance with an embodiment, the plurality of pipelines can execute a workload on multiple databases concurrently. Each pipeline can be created by a pipeline control manager in response to receiving a workload configuration via a REST API.

As shown in FIG. 7, two pipelines 712 and 713 can be executed in parallel by a pipeline control manager 701, which can schedule and track the pipelines. Each pipeline can take a test input 702 or 703, and generate a test output 704 or 705.

In accordance with an embodiment, a pipeline can include multiple stages, for example, a map stage 711 or 721, a qualify stage 713 or 723, an execute stage 715 or 725, and an assimilate stage 717 or 727, from initiation to the completion of a workload.

In accordance with an embodiment, a stage coordinator 720 or 722 can track data flow between stages in a pipeline, and can execute the stages in a sequence and get the results from each stage after the execution of the stage.

In accordance with an embodiment, each pipeline stage can be independent and does not interfere with the execution of another stage. If any of the stage fails, the stage coordinator can stop the execution of the next stage, and send a failure status to the pipeline control manager.

In accordance with an embodiment, tasks executed by each stage can uniquely identified by Task IDs with a scope limited to the stage coordinator.

In accordance with an embodiment, the pipelines can maintain instructions, runtime statistics and updates in the pipeline, thereby reducing disk I/O operations and disk throughput.

Figure 8:
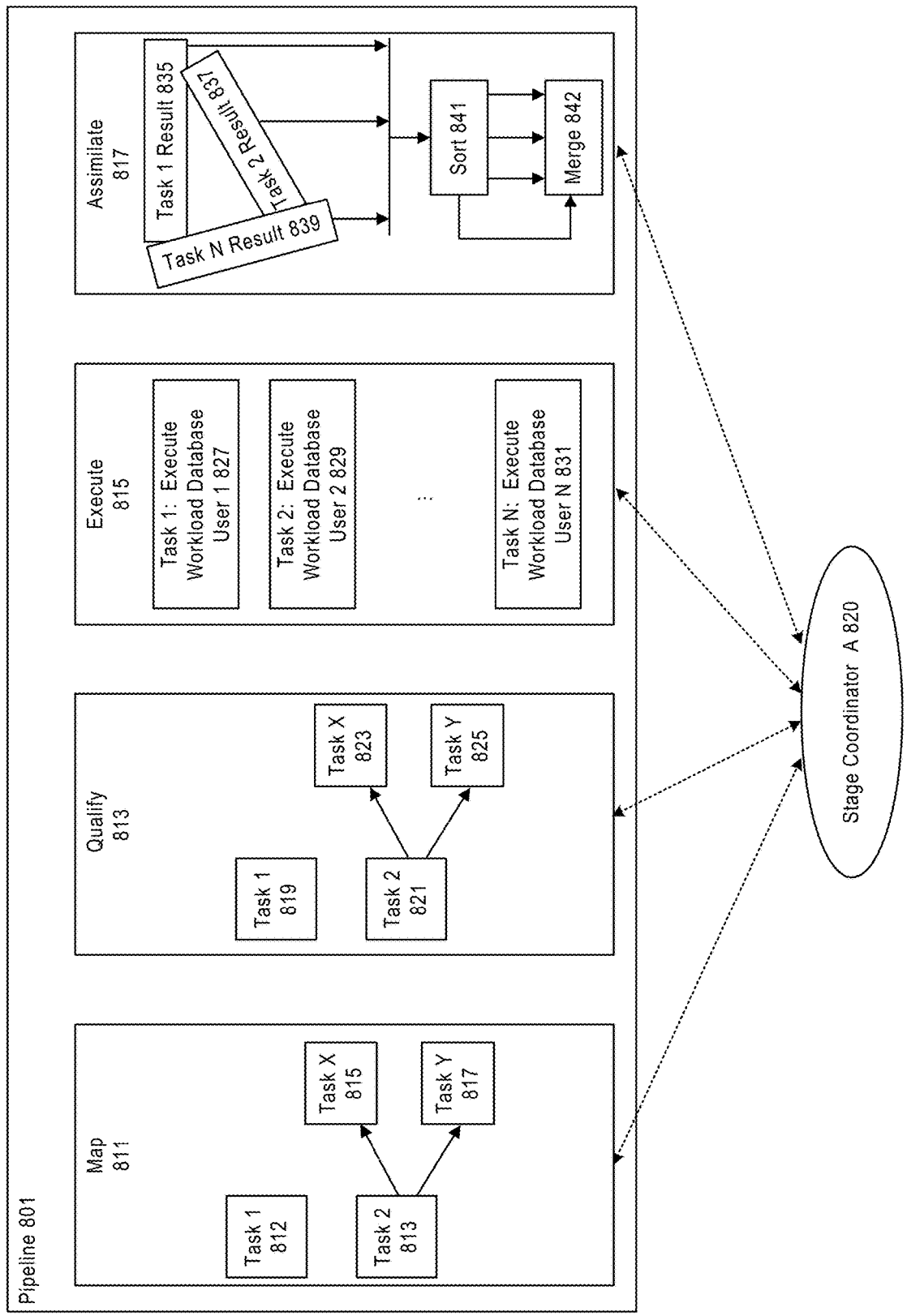
FIG. 8 illustrates example pipeline stages in accordance with an embodiment.

FIG. 8 illustrates example pipeline stages in accordance with an embodiment.

As shown in FIG. 8, a pipeline 801 can include a map stage 811, a qualify stage 813, an execute stage 815, and an assimilate stage 817.

In accordance with an embodiment, the pipeline stages can be implemented using different software modules or one software module (e.g., a microservice). Each pipeline stage can include a plurality of pre-defined tasks. One or more pre-defined tasks can execute in parallel (concurrently) with at least another pre-defined task, and at least one pre-defined task can be further split into sub-tasks that can execute in parallel.

For example, task 1 812 and task 2 813 shown in FIG. 8 can execute in parallel in different threads or using different microservices. Task 2 can be further split into task X 815 and task Y 817 to be executed in parallel.

Example pre-defined tasks for the map stage can include:
1). Verifying the current benchmark system and checking whether the CPU, memory, or I/O resources are already heavily utilized or not. It does not execute the workload if performance metrics of the current test system do not meet certain requirements.
2). Validating the configuration and workload created by an end user (e.g., a database administrator).
3). Verifying established connections made with the respective database and database server.
4). Verifying that all the preliminary services of databases are running on the database server.
5). Creating source and target databases in the respective database servers per the workload configuration, and providing required permissions if needed.
6). Creating database users.
7). Validating memory usage of the source database server and target database server. These servers should have the sufficient free memory to execute the workload.
8). Validating and creating a backup of the database transaction log.

In the example tasks listed above, the task of verifying the memory usage of the source database server and the target database server can be split into two sub-tasks: 1). verifying memory usage of the source target database; 2). verifying memory usage of the target database server. The two sub-tasks can execute in parallel.

In accordance with an embodiment, the qualify stage can receive workload configuration data from the map stage, and qualify and validate the workload configuration data, which can include database and server details, and workload configuration.

In accordance with an embodiment, the qualify stage can also validate the output of each task of the map stage, and determine if all the tasks of the map stage report a success status before starting to execute tasks of the qualify stage. The qualify stage can provide the status and result of each task to the stage coordinator. As in the map stage, the qualify stage can determine which tasks can execute in parallel, and which task can be further split into sub-tasks for parallel execution.

As shown in FIG. 8, task 1 819 and task 2 821 are preconfigured for the qualify stage, and Task 2 can be further split into task X 823 and task Y 825 for parallel execution.

Example tasks of the qualify stage can include:
1). Validating available disk space to make sure that the workload should not stop with disk space capacity constraint.
2). Creating tables per workload configuration.
3). Validating that all replication processes are running on the source and target database server.
4). Creating a backup database transaction log.
5). Validating that LOBs (Large Objects) are available in the respective place.
6). Obtaining the operating system initial performance matrix.
7). Obtaining the database initial performance matrix.

In accordance with an embodiment, the execute stage can execute a workload in accordance with an execution plan. Both the workload and the execution can be defined in a workload configuration.

For example, as shown in FIG. 8, a plurality of database users 827, 829, and 831 specified in the workload configuration can be used for executing the workload in parallel. Each database user can use one thread.

In accordance with an embodiment, the assimilate stage can receive status information and results from the stage coordinator, and consolidate them in the order of execution.

As shown in FIG. 8, task 1 835, task 2 837, and task N 839 started in the execute stage can complete at different times.

The execute stage can sort 841 the results from the tasks, and merge 842 them. The merged results and performance metrics from each stage can be combined into a final output to an end user.

User Interface

In accordance with an embodiment, a benchmark application can include a user interface for end users to set up workload configurations, to modify existing workload configurations. The user interface can also display performance metrics.

Figure 9:
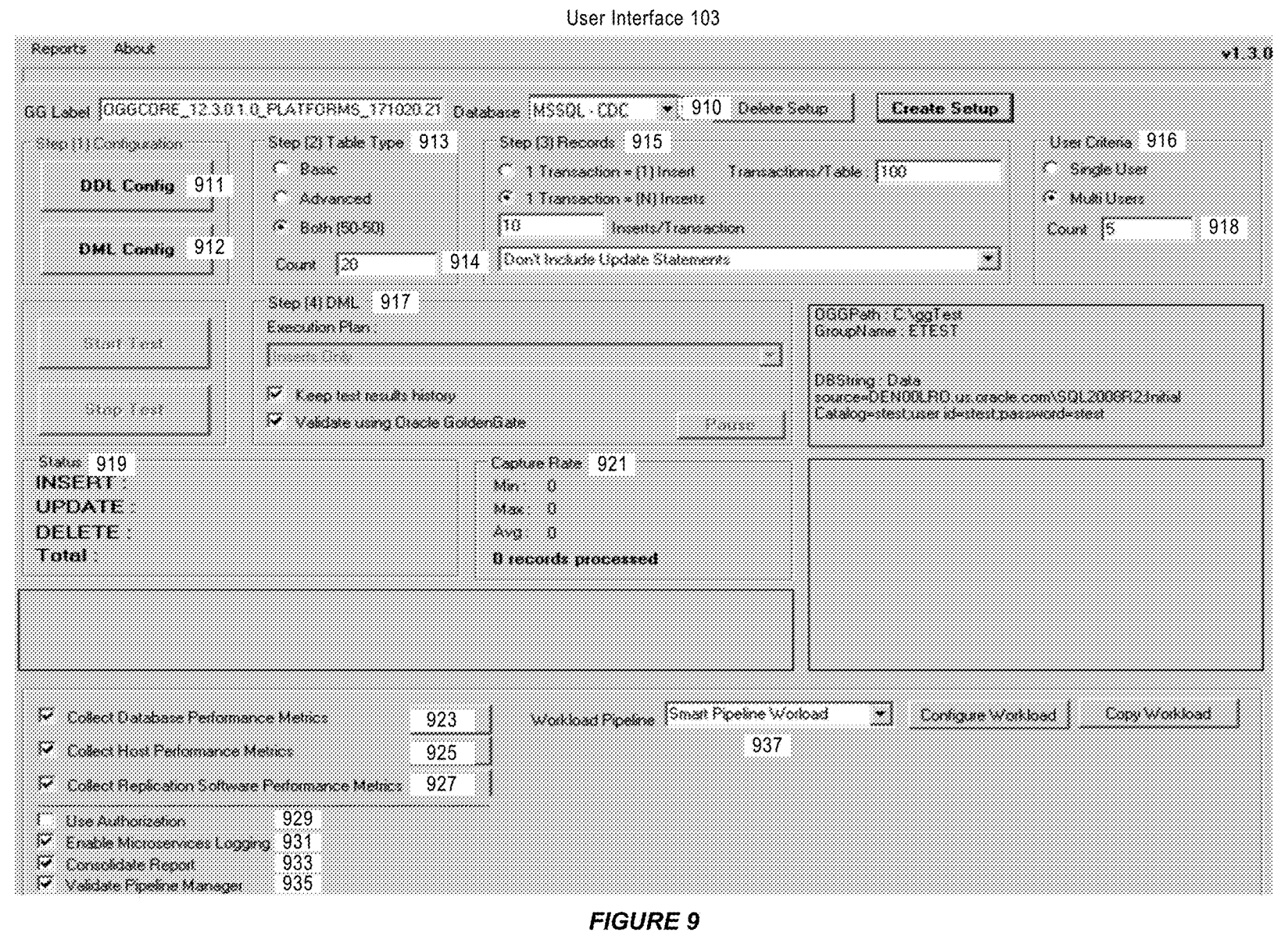

FIG. 9 illustrates an example user interface, in accordance with an embodiment.

As shown in FIG. 9, the user interface enables an end user to select a target database 910 for database replication. Through the user interface, an end user can configure a plurality of parameters on the target database, including DDL operations 911, DML operations 912, table type 913, table count 914, records 915, user criteria 916, user count 918, and an execution plan 917.

As further shown, the user interface can display a workload execution status 919 for each database operation, and capture rate statistics 921.

In accordance with an embodiment, the user interface can include a dropdown list for an end user to select a pipeline 937, and a plurality of selectable options.

For example, using the plurality of selectable options, an end user can choose whether to collect database performance metrics 923, host performance metrics 925, and database replication performance metrics 927. Other selection options can include whether to enable user authorization 929 for the benchmark application and microservices logging 931, whether to consolidate performance reports 933, and whether to validate a pipeline control manager 935.

Figure 10:
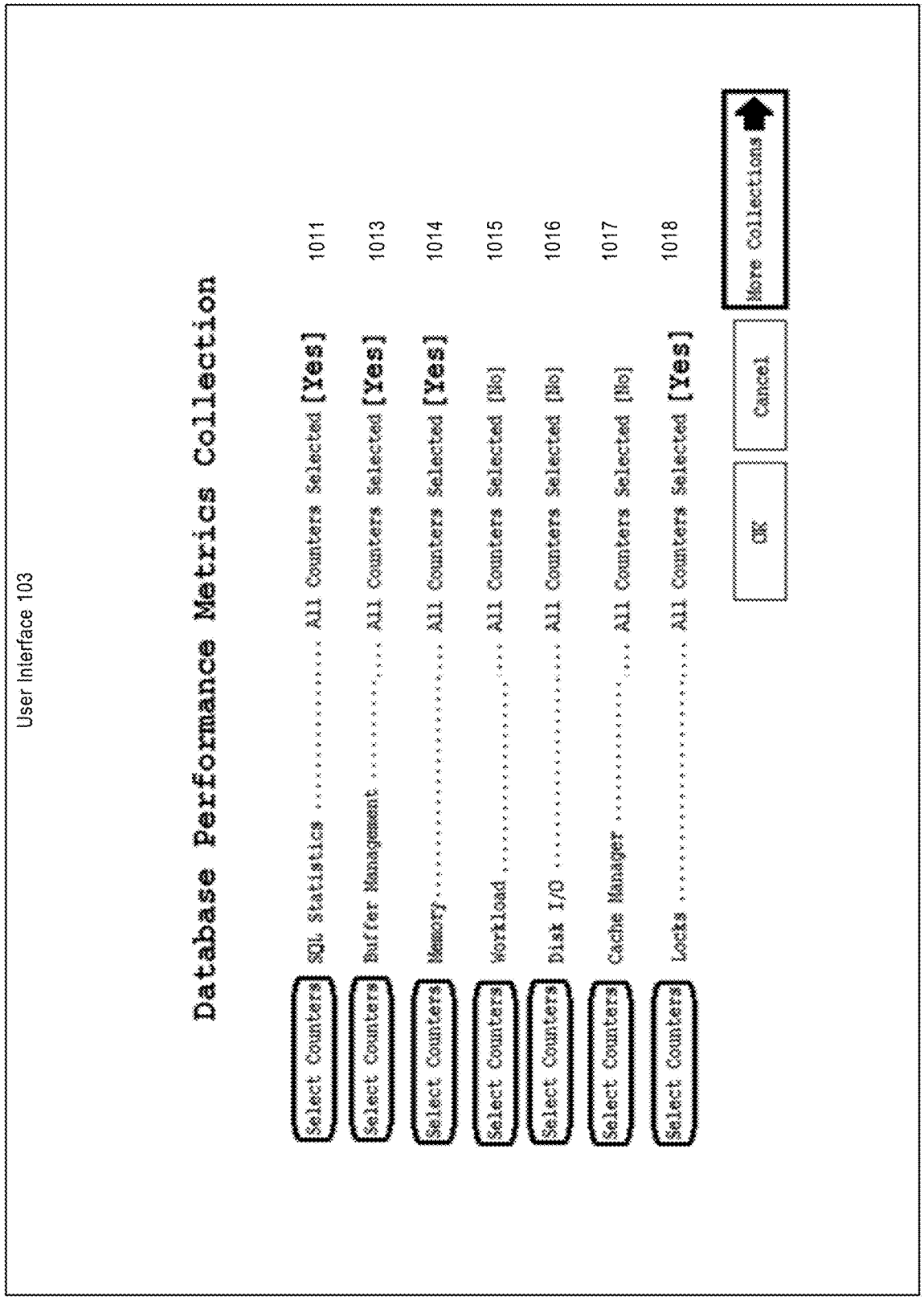
FIGS. 10-12 illustrates performance metrics selected for collection in accordance with an embodiment.
Figure 11:
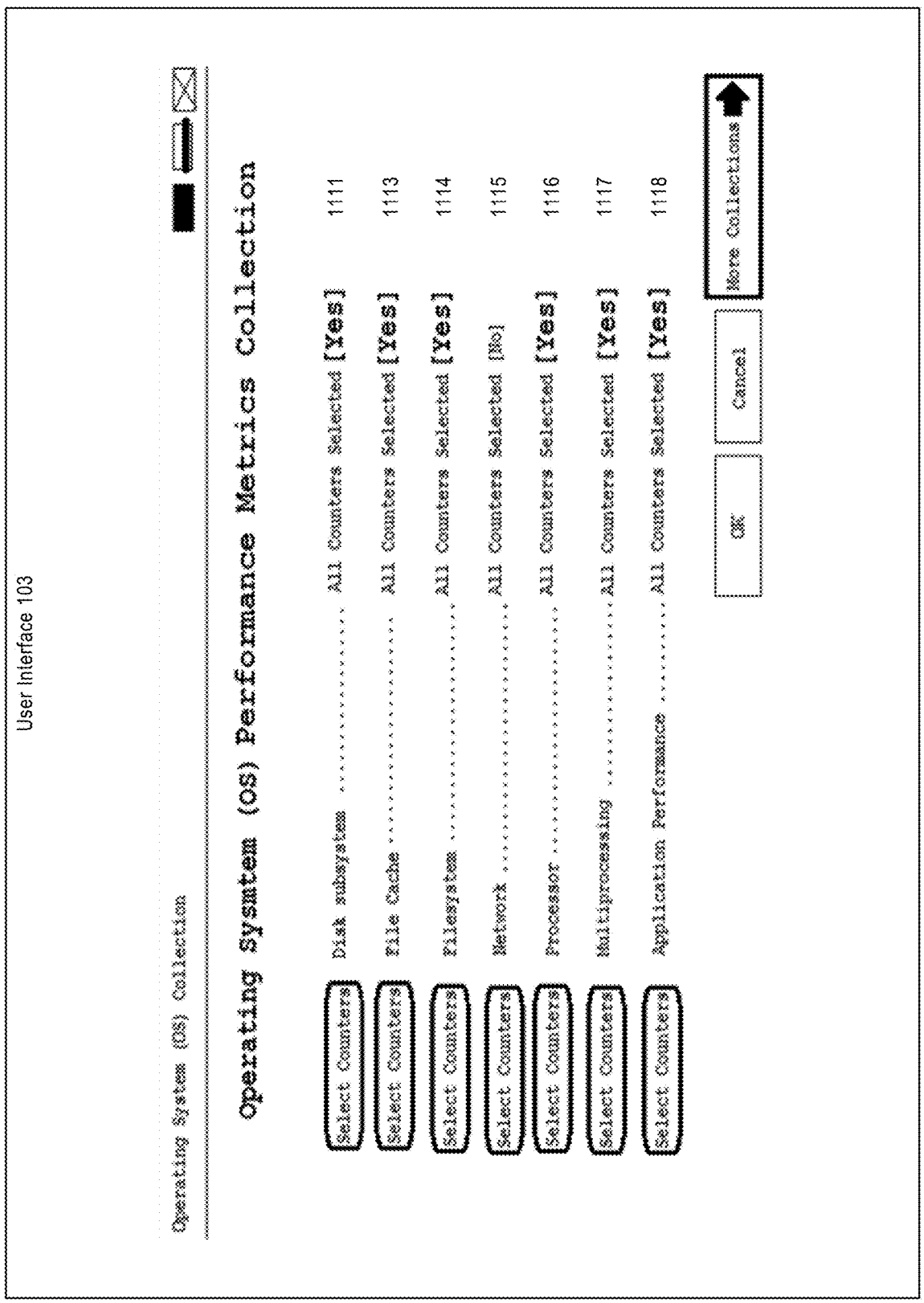
Figure 12:
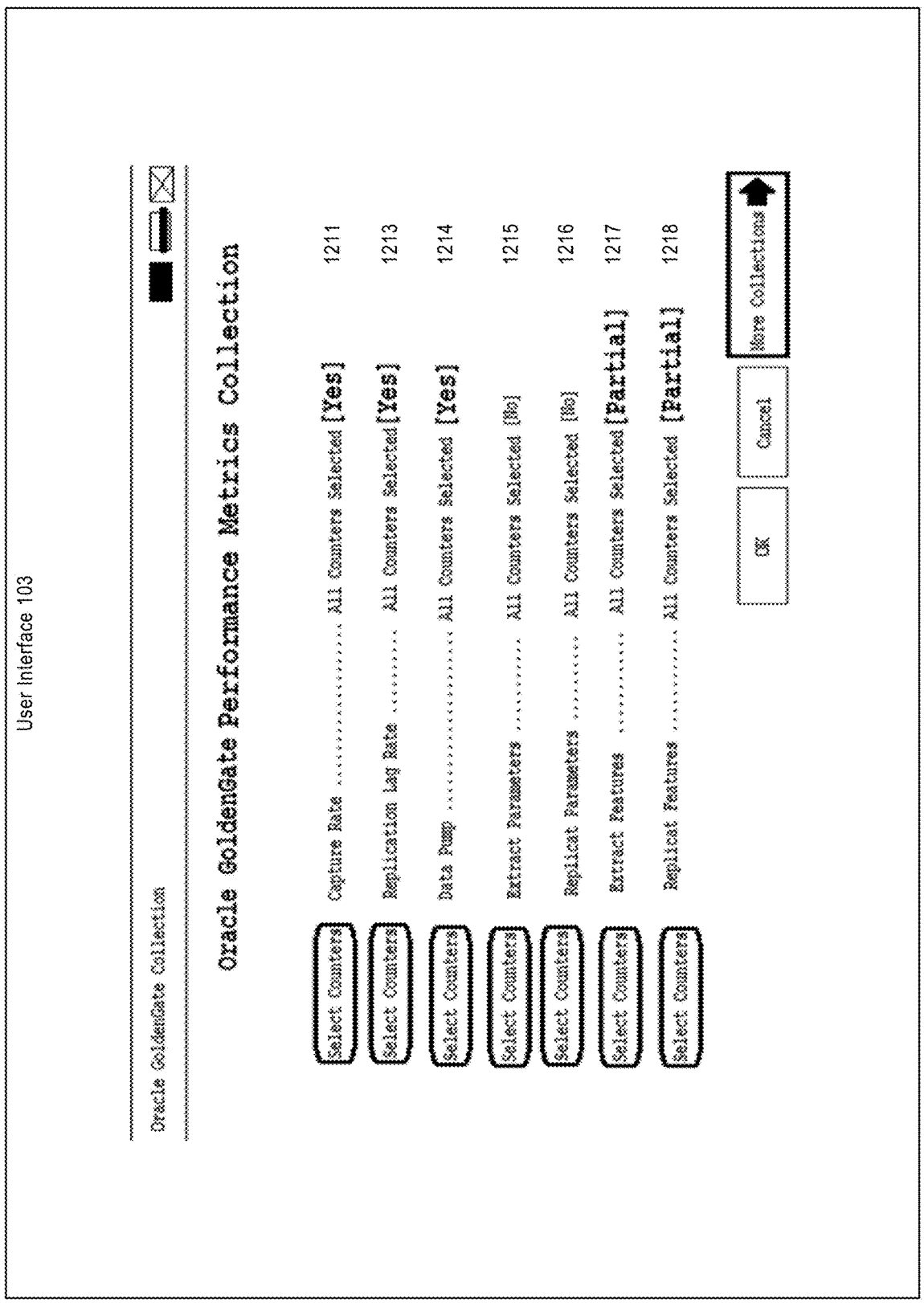

FIGS. 10-12 illustrates performance metrics selected for collection, in accordance with an embodiment.

FIG. 10 illustrate performance metrics to be collected from a target database. As shown in the figure, the performance metrics can include counters on SQL statistics 1011, buffer management 1013, memory 1014, workload 1015, disk I/O 1016, cache manager 1017, and locks 1018.

FIG. 11 illustrate performance metrics to be collected from an operating system. The operating system can be an operating system on any machine in a testing environment. As shown in the figure, the performance metrics can include counters on disk subsystem 1111, file cache 1113, file system 1114, network 1115, processor 1116, multiprocessing 1117, and application performance 1118.

FIG. 12 illustrate performance metrics to be collected from Oracle GoldenGate or another database replication application. As shown in the figure, the performance metric to be collected can include counters on capture rate 1211, replication lag rate 1213, data pump parameters 1214, extract parameters 1215, replication parameters 1216, extract features 1217, and replication features 1218.

Figure 13:
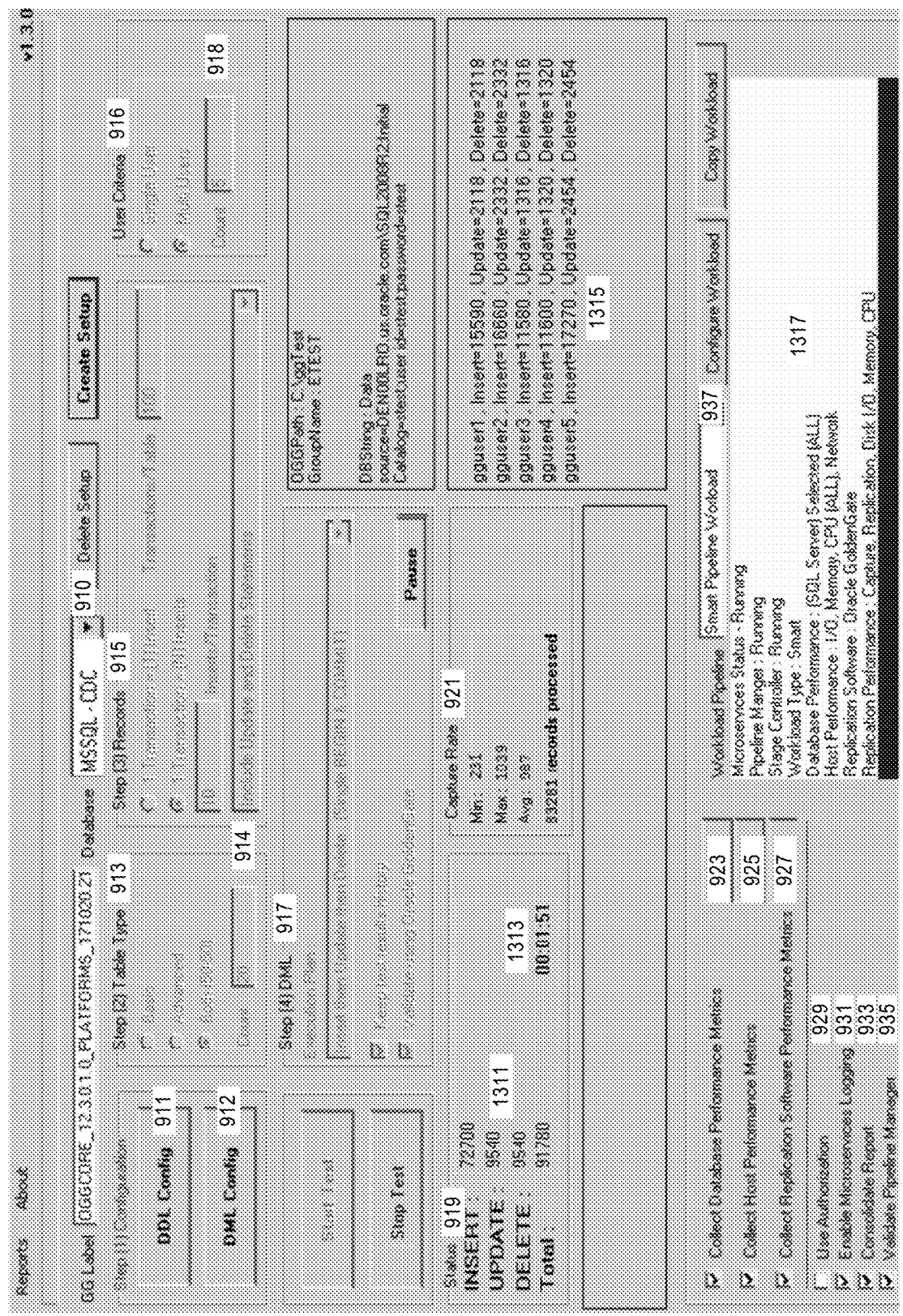
FIG. 13 illustrates a workload running status in accordance with an embodiment.

FIG. 13 illustrates a workload running status, in accordance with an embodiment.

In accordance with an embodiment, the example workload running status can include a number for each type of database operations (i.e., insert operations, update operations, and delete operations), a total number of the above operations 1311, a running time 1313, database operations per user 1315, and a running status 1317 of each component in a benchmark application.

Figure 14:
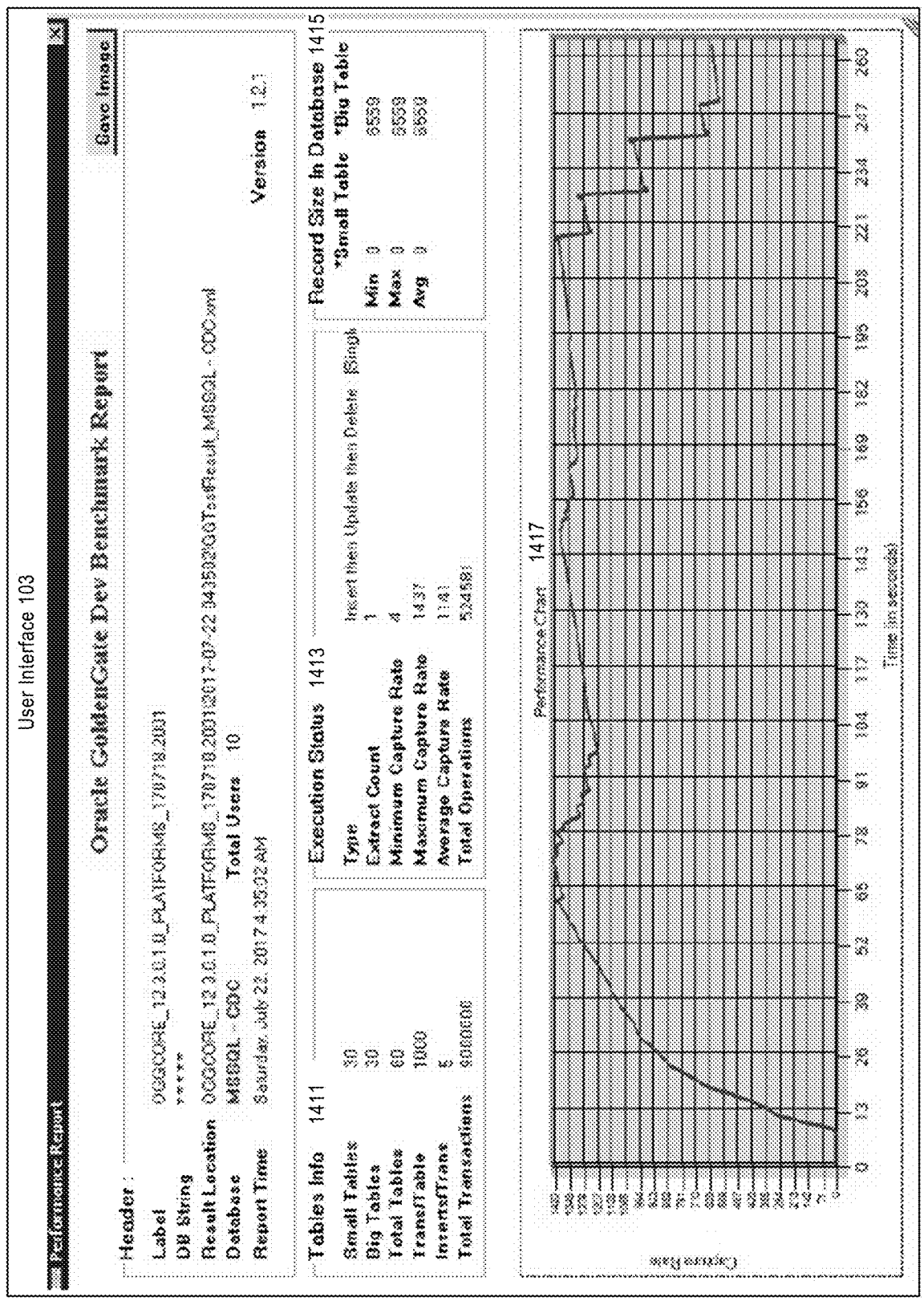
FIG. 14 illustrates an example benchmark report in accordance with an embodiment.

FIG. 14 illustrates an example benchmark report, in accordance with an embodiment. As shown in FIG. 14, the benchmark report can include table information 1411, execution status information 1413, record size information 1415, and a performance chart 1417.

Figure 15:
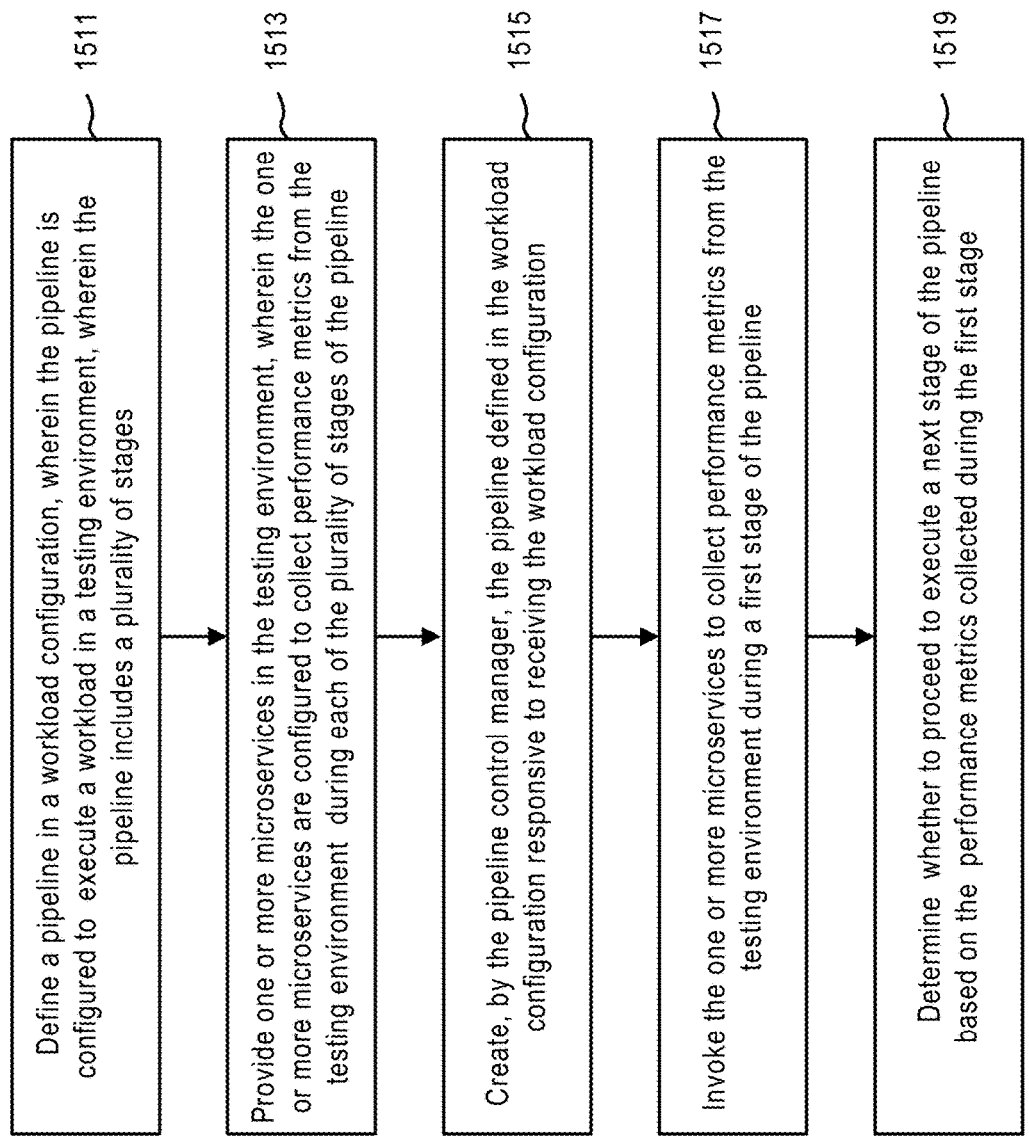
FIG. 15 illustrates a method for using a pipeline-based microservices model to benchmark a data replication, in accordance with an embodiment.

FIG. 15 illustrates a method for using a pipeline-based microservices model to benchmark a data replication, in accordance with an embodiment.

As shown in FIG. 15, at step 1511, a pipeline is defined in a workload configuration, wherein the pipeline is configured to execute a workload in a testing environment, wherein the pipeline includes a plurality of stages.

At step 1513, one or more microservices are provided in the testing environment, wherein the one or more microservices are configured to collect performance metrics from the testing environment during each of the plurality of stages of the pipeline.

At step 1515, a pipeline control manager executing on one or more microprocessors create the pipeline defined in the workload configuration responsive to receiving the workload configuration.

At step 1517, the pipeline control manager invoke the one or more microservices to collect performance metrics from the testing environment during a first stage of the pipeline.

At step 1519, the pipeline control manager determines whether to proceed to execute a next stage of the pipeline based on the performance metrics collected during the first stage.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for benchmark testing database replication applications, comprising:
   a computer including one or more microprocessors coupled to a memory;
   a workload configuration that defines a pipeline for executing a workload to benchmark test a database replication application in a testing environment, wherein the database replication application is adapted to capture and replicate data changes from a source database to a target database, and wherein the pipeline includes a plurality of stages adapted to test a replication feature of the database replication application;
   one or more microservices executing in the testing environment, wherein the one or more microservices are configured to collect performance metrics from the testing environment during each of the plurality of stages of the pipeline during testing of replication features;
   a pipeline control manager, executing on the computer, that operates to test the replication features of the database replication application, including:
   create the pipeline defined in the workload configuration responsive to receiving the workload configuration,
   maintain an information for each pipeline created by the pipeline control manager including a creation time and unique identifier for the pipeline, which information is used to filter performance metrics associated with replication feature testing,
   invoke the one or more microservices to collect the performance metrics from, and validate the testing environment during a first stage of the pipeline, and
   determine whether to proceed to execute a next stage of the pipeline and continue testing the database replication application, based on the performance metrics collected during the first stage of the pipeline;
   wherein the workload configuration is selected from a plurality of workload configurations stored in a workload configuration store in the testing environment, wherein the plurality of workload configurations define a plurality of pipelines of different types;
   wherein at least one of the plurality of workload configurations is configured to benchmark test an individual replication feature of the database replication application, wherein when the individual feature of the database replication application is selected at a user interface, a corresponding workload configuration is automatically selected at the user interface from the plurality of workload configurations.

2. The system of claim 1, wherein determining whether to proceed to execute a next stage of the pipeline includes determining that at least one of the collected performance metrics exceeds a threshold value, and providing one or more actions for display on the user interface for an end user to accept or reject.

3. The system of claim 2, wherein the one or more actions include one or more of terminating an application, cleaning disk temporary files, restarting database services, or restarting the database replication application.

4. The system of claim 2, wherein the pipeline control manager starts to execute a next stage in the pipeline responsive to the end user accepting the one or more actions.

5. The system of claim 4, wherein the pipeline control manager continues to collect performance metrics during the execution of each remaining stage, and to recommend one or more actions to an end user if at least one of the collected performance metrics exceeds the threshold during the execution of each remaining stage.

6. The system of claim 1, wherein the testing environment includes one or more machines that host the database replication application, a source database, a target database, a plurality of microservices, and the pipeline control manager.

7. The system of claim 1, wherein the collected performance metrics include counter values on one or more of CPUs, disk I/O, network, and memory in the testing environment.

8. The system of claim 1, wherein the workload configuration defines one or more of a source database, a target database, a pipeline type, a number of users, a number of tables to be created, or an execution plan.

9. The system of claim 1, wherein each of the plurality of microservices includes a representational state transfer (RESTful) APIs.

10. The system of claim 1, wherein the pipeline control manager is implemented in a cloud environment or an on-premise environment.

11. A method for benchmark testing database replication applications, comprising:
    defining a pipeline in a workload configuration, wherein the pipeline is configured to execute a workload in a testing environment, wherein the database replication application is adapted to capture and replicate data changes from a source database to a target database, and wherein the pipeline includes a plurality of stages adapted to test a replication feature of the database replication application;
    providing one or more microservices in the testing environment, wherein the one or more microservices are configured to collect performance metrics from the testing environment during each of the plurality of stages of the pipeline during testing of replication features;
    creating, by a pipeline control manager executing on one or more microprocessors, a pipeline defined in a workload configuration received at the pipeline control manager;
    maintaining an information for each pipeline created by the pipeline control manager including a creation time and unique identifier for the pipeline, which information is used to filter performance metrics associated with replication feature testing;
    invoking the one or more microservices to collect the performance metrics from, and validate the testing environment during a first stage of the pipeline; and
    determining whether to proceed to execute a next stage of the pipeline and continue testing the database replication application, based on the performance metrics collected during the first stage of the pipeline;
    wherein the workload configuration is selected from a plurality of workload configurations stored in a workload configuration store in the testing environment, wherein the plurality of workload configurations define a plurality of pipelines of different types;
    wherein at least one of the plurality of workload configurations is configured to benchmark test an individual replication feature of the database replication application, wherein when the individual feature of the database replication application is selected at a user interface, a corresponding workload configuration is automatically selected at the user interface from the plurality of workload configurations.

12. The method of claim 11, wherein determining whether to proceed to execute a next stage of the pipeline includes determining that at least one of the collected performance metrics exceeds a threshold value, and providing one or more actions for display on the user interface for an end user to accept or reject.

13. The method of claim 12, wherein the one or more actions include one or more of terminating an application, cleaning disk temporary files, restarting database services, or restarting the database replication application.

14. The method of claim 12, wherein the pipeline control manager starts to execute a next stage in the pipeline responsive to the end user accepting the one or more actions.

15. The method of claim 14, wherein the pipeline control manager continues to collect performance metrics during the execution of each remaining stage, and to recommend one or more actions to an end user if at least one of the collected performance metrics exceeds the threshold during the execution of each remaining stage.

16. The method of claim 11, wherein the testing environment includes one or more machines that host the database replication application, a source database, a target database, a plurality of microservices, and the pipeline control manager.

17. The method of claim 11, wherein the collected performance metrics include counter values on one or more of CPUs, disk I/O, network, and memory in the testing environment.

18. A non-transitory computer-readable storage medium storing a set of instructions for benchmark testing database replication applications, said instructions, when executed by one or more processors, causing the one or more processors to perform steps comprising:
    defining a pipeline in a workload configuration, wherein the pipeline is configured to execute a workload in a testing environment, wherein the database replication application is adapted to capture and replicate data changes from a source database to a target database, and wherein the pipeline includes a plurality of stages adapted to test a replication feature of the database replication application;
    providing one or more microservices in the testing environment, wherein the one or more microservices are configured to collect performance metrics from the testing environment during each of the plurality of stages of the pipeline during testing of replication features;
    creating, by a pipeline control manager executing on one or more microprocessors, a pipeline defined in a workload configuration received at the pipeline control manager;
    maintaining an information for each pipeline created by the pipeline control manager including a creation time and unique identifier for the pipeline, which information is used to filter performance metrics associated with replication feature testing;
    invoking the one or more microservices to collect the performance metrics from, and validate the testing environment during a first stage of the pipeline; and determining whether to proceed to execute a next stage of the pipeline and continue testing the database replication application, based on the performance metrics collected during the first stage of the pipeline;

wherein the workload configuration is selected from a plurality of workload configurations stored in a workload configuration store in the testing environment, wherein the plurality of workload configurations define a plurality of pipelines of different types;

wherein at least one of the plurality of workload configurations is configured to benchmark test an individual replication feature of the database replication application, wherein when the individual feature of the database replication application is selected at a user interface, a corresponding workload configuration is automatically selected at the user interface from the plurality of workload configurations.

* * * * *